US008692698B2

(12) United States Patent
Reitmeier et al.

(10) Patent No.: US 8,692,698 B2
(45) Date of Patent: Apr. 8, 2014

(54) CODING DEVICE, DEVICE FOR REPROCESSING A DIGITAL BASEBAND SIGNAL OR INTERMEDIATE FREQUENCY SIGNAL, SYSTEM AND METHOD FOR EXTERNAL DIGITAL CODING

(75) Inventors: Manfred Reitmeier, Landshut (DE); Cornelius Heinemann, Erding (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 100 days.

(21) Appl. No.: 13/391,617

(22) PCT Filed: Aug. 3, 2010

(86) PCT No.: PCT/EP2010/004740
§ 371 (c)(1),
(2), (4) Date: Feb. 21, 2012

(87) PCT Pub. No.: WO2011/020558
PCT Pub. Date: Feb. 24, 2011

(65) Prior Publication Data
US 2012/0146827 A1     Jun. 14, 2012

(30) Foreign Application Priority Data

Aug. 20, 2009  (DE) .......................... 10 2009 038 269
Mar. 23, 2010  (DE) .......................... 10 2010 012 428

(51) Int. Cl.
*H03M 9/00*         (2006.01)
(52) U.S. Cl.
USPC ......................................... 341/101; 341/100
(58) Field of Classification Search
USPC .............. 341/101, 100, 110; 713/600; 710/52
See application file for complete search history.

(56) References Cited

U.S. PATENT DOCUMENTS

| 7,106,637 | B2 * | 9/2006 | Lovett et al. ................... 365/194 |
| 7,607,064 | B2 * | 10/2009 | Lorenz .......................... 714/752 |
| 7,787,577 | B2 * | 8/2010 | Gundurao et al. ............ 375/354 |
| 7,996,704 | B2 * | 8/2011 | Chen ............................. 713/600 |
| 8,356,203 | B2 * | 1/2013 | Uchida et al. ................. 713/600 |
| 2005/0034156 | A1 | 2/2005 | Terui |

FOREIGN PATENT DOCUMENTS

| DE | 199 48 383 A1 | 4/2001 |
| FR | 2 864 404 A1 | 6/2005 |

OTHER PUBLICATIONS

"European Standard: Cabled Distribution Systems for Television, Sound and Interactive Signals. Part 9: Interfaces for CATV/SMATV Headends and Similar Professional Equipment for DVB/MPEG-2 Transport Streams," Ref. No. EN 50083-9:1997 E, CENELEC, Brussels, Mar. 1997, 51 pages.

(Continued)

*Primary Examiner* — Brian Young
(74) *Attorney, Agent, or Firm* — Christensen O'Connor Johnson Kindness PLLC

(57) ABSTRACT

The invention relates to a method and a system for external, digital coding of a baseband or intermediate-frequency signal. Initially, a digital datastream is converted in a coding device into a digital-baseband signal in the time domain or into a digital intermediate-frequency signal in the time domain. The digitally generated signal is output via an asynchronous-serial interface of the coding device to another device. Such a device also provides an asynchronous-serial interface, which is connected to the asynchronous-serial interface of the coding device. The device reads in the output digital-baseband signal or intermediate-frequency signal for further processing.

15 Claims, 3 Drawing Sheets

(56) References Cited

OTHER PUBLICATIONS

"European Standard (Telecommunications Series): Digital Video Broadcasting (DVB); Framing Structure, Channel Coding and Modulation for Digital Terrestrial Television," Ref. No. EN 300 744 V1.1.2, European Telecommunications Standards Institute (ETSI), Valbonne, France, Aug. 1997, 47 pages.

International Search Report mailed Aug. 11, 2010, issued in corresponding International Application No. PCT/EP2010/004740, filed Aug. 3, 2010, 3 pages.

* cited by examiner

CODING DEVICE, DEVICE FOR REPROCESSING A DIGITAL BASEBAND SIGNAL OR INTERMEDIATE FREQUENCY SIGNAL, SYSTEM AND METHOD FOR EXTERNAL DIGITAL CODING

The invention relates to a coding device for converting a digital datastream, a device for further processing of a digital-baseband signal or a digital intermediate-frequency signal, a system comprising the said coding device and device, and a method for the external digital coding of a digital datastream.

In digital radio, regional and/or international standards are defined for the transmission of continuous digital datastreams such as music or video data. Accordingly, for example, in Europe, DVB ("Digital Video Broadcasting") has been defined as the standard for digital television and DAB ("Digital Audio Broadcasting") has been specified as the standard for digital radio. Because of this specification, a radio standard does not reflect the latest state of digital transmission technology. Accordingly, the digital radio standards are being replaced by new radio standards, which, in turn, demand radio transmission devices adapted to the new standards.

In radio systems of the terrestrial digital video broadcasting standard DVB-T, a video datastream is transferred via an asynchronous-serial interface ("Asynchronous-Serial Interface", ASI) to a control transmitter ("exciter"), which converts the video datastream into a radio signal according to the DVB-T standard and passes the radio signal to an amplifier. The amplifier transmits the amplified radio signal by means of a radio antenna.

If a new radio standard, such as DVB-T2 were now to be used, the control transmitter would have to be adapted to the new radio standard, for example, in order to deal with larger data volumes. The previously used control transmitters are not designed for these higher requirements of the DVB-T2 standard, so that a simple reprogramming of the control transmitter is insufficient.

The object of the invention is to resolve these problems of the prior art and to find a simple and cost-favourable alternative for the replacement of the entire control transmitter.

The object is achieved by the coding device according to claim 1. The coding device according to the invention is suitable for converting a digital datastream into a digital-baseband signal in the time domain or into a digital intermediate-frequency signal in the time domain. The coding device provides an asynchronous-serial interface for the output of this digital-baseband signal or intermediate-frequency signal generated in the coding device.

The object is further achieved by a device according to the invention as specified in claim 7. The device according to the invention is suitable for the further processing of a digital-baseband signal in the time domain or a digital intermediate-frequency signal in the time domain. The device according to the invention provides an asynchronous-serial interface for the input of the digital-baseband signal or intermediate-frequency signal.

The invention is further achieved by a system according to the invention as specified in claim 14. The system provides a previously described coding device according to the invention and a previously described device according to the invention. The asynchronous-serial interface of the coding device and the asynchronous-serial interface of the device are connected to one another.

The object is achieved by the method according to the invention for external digital coding of a baseband signal or intermediate-frequency signal according to claim 15. The method according to the invention provides the following steps: a digital datastream is converted in a coding device into a digital-baseband signal in the time domain or into a digital intermediate-frequency signal in the time domain. Following this, the digital-baseband signal or intermediate-frequency signal is output via an asynchronous-serial interface of the coding device. The output digital-baseband signal is transferred by a transmission means, such as a cable, to an asynchronous-serial interface of the device, where it is input by the device. The device further processes the input digital-baseband signal or intermediate-frequency signal.

Through the external coding, that is, a coding outside the control transmitter of a digital-baseband signal or of a digital intermediate-frequency signal in the time domain within an external device, and the transfer of this signal generated there by means of the existing ASI interface of the control transmitter, a replacement of the transmission standard of the control transmitter to be fulfilled after a change can be avoided. The control transmitter then requires only a software update, which determines the instructions for reading out the digital-baseband signal or the digital intermediate-frequency signal from the transmitted signal of the ASI interface and bridges the coding according to the old standard. By providing a digital signal in the time domain, the baseband signal or intermediate-frequency signal can be transmitted via the digital ASI interface.

The dependent claims relate to advantageous further developments of the invention.

The coding device advantageously provides an output device for connection or respectively connected to the asynchronous-serial interface. The output device is suitable for the translation of the digital-baseband signal or intermediate-frequency signal into the transmission format of the ASI interface, so that the control transmitter can receive the externally coded digital-baseband signal via the existing ASI interface, because no input for digital baseband or intermediate-frequency signals is provided in the control transmitter. Accordingly, the device according to the invention provides an input device connected to the asynchronous-serial interface of the device. The input device is suitable for reading in the digital-baseband signal or the digital intermediate-frequency signal from a signal present in the transmission format of the asynchronous-serial interface. With such a matching of the control transmitter as a device according to the invention, the control transmitter can read in the externally coded digital-baseband signal or intermediate-frequency signal and can further process the input digital signal. The matching required for further processing is preferably realised through a software update.

It is particularly advantageous to subdivide the data of every test point of the digital-baseband signal or intermediate-frequency signal in the output device of the coding device over the transmission blocks of the transmission format of the ASI-interface and to output the blocking pattern with the converted digital-baseband signal or intermediate-frequency signal, if the data size of a test point is greater than the data size of the transmission block. Accordingly, within the input device of the device, every test point of the digital-baseband signal or intermediate frequency signal is, in this case, determined from the transmission blocks on the basis of a blocking pattern input with the digital-baseband signal or intermediate-frequency signal. In this context, the blocking pattern indicates the information necessary in order to reconstruct a test point from a plurality of transmission blocks, especially the ordering and sequence of the information of the test point contained in the plurality of transmission blocks. This has the advantage that the data size of a test point and accordingly the resolution of the digital-baseband signal or intermediate-frequency signal in the time domain is not restricted by the size or length of a transmission block.

It is particularly advantageous that the coding device provides a synchronization unit for generating a clock signal connected to the output device and/or a synchronization interface for the output of the clock signal. Furthermore, connected to the input device, the device also provides a synchronization interface for the input of a clock signal. Through a connection of the two synchronization interfaces, the input device can be synchronized with the output device, and parallel output signals can be synchronized via further ASI-interfaces of the coding device or parallel input signals of further interfaces of the input device can be synchronized the clock signal. At the same time, this clock signal can be further used within the device for the synchronized of a common-mode network to the clock signal of the coding device.

It is, moreover, advantageous that the coding device provides at least one further ASI-interface, and that a first portion of the digital-baseband signal is output as a first digital signal, and a second portion of the digital-baseband signal is output as a second digital signal via different ASI-interfaces. Further portions can accordingly be transmitted via further ASI-interfaces. It is also advantageous that the device provides a further asynchronous-serial interface, the first digital signal and the second digital signal are input via different asynchronous-serial interfaces. With two ASI-interfaces, the maximum transmission rate between the coding device and the device can be doubled. The first and the second portion of the digital-baseband signal or intermediate-frequency signal are preferably the real component and the imaginary component of the inverse Fourier transform of the baseband signal or intermediate-frequency signal in the frequency domain, that is to say, of the points in the in-phase quadrature domain distributed over the orthogonal frequencies of the frequency band. The separate transmission of the first and second portion of the baseband signal or intermediate-frequency signal is particularly advantageous, because, in this manner, no further data are required at the device end for combining the first and second component of the baseband signal. As a result, the doubled, maximum transmission rate is not narrowed by additional information for combining the baseband signal or intermediate-frequency signal components transmitted in parallel.

Moreover, it is advantageous that the device provides a digital/analog converter, which converts the digital-baseband signal into an analog baseband signal or the digital intermediate-frequency signal into an analog intermediate-frequency signal.

Furthermore, it is advantageous that the device comprises a transmission device for the transmission of the analog baseband signal mixed to a carrier frequency or for the transmission of the analog intermediate-frequency signal mixed to a carrier frequency.

It is further advantageous that the coding device provides an asynchronous-serial input interface for the input of the digital datastream, wherein the asynchronous-serial input interface can be connected directly to the asynchronous-serial interface of the coding device. Furthermore, it is advantageous that the device comprises a coding unit for the conversion of a digital datastream into a digital-baseband signal in the time domain or into a digital intermediate-frequency signal in the time domain, wherein the coding unit can be switched between the asynchronous-serial interface and the digital/analog converter. Accordingly, the system can additionally provide a simply realised and cost-favourable downward compatibility with an older radio standard.

A preferred exemplary embodiment of the invention is described below with reference to the drawings. The drawings are as follows.

Figure 1:
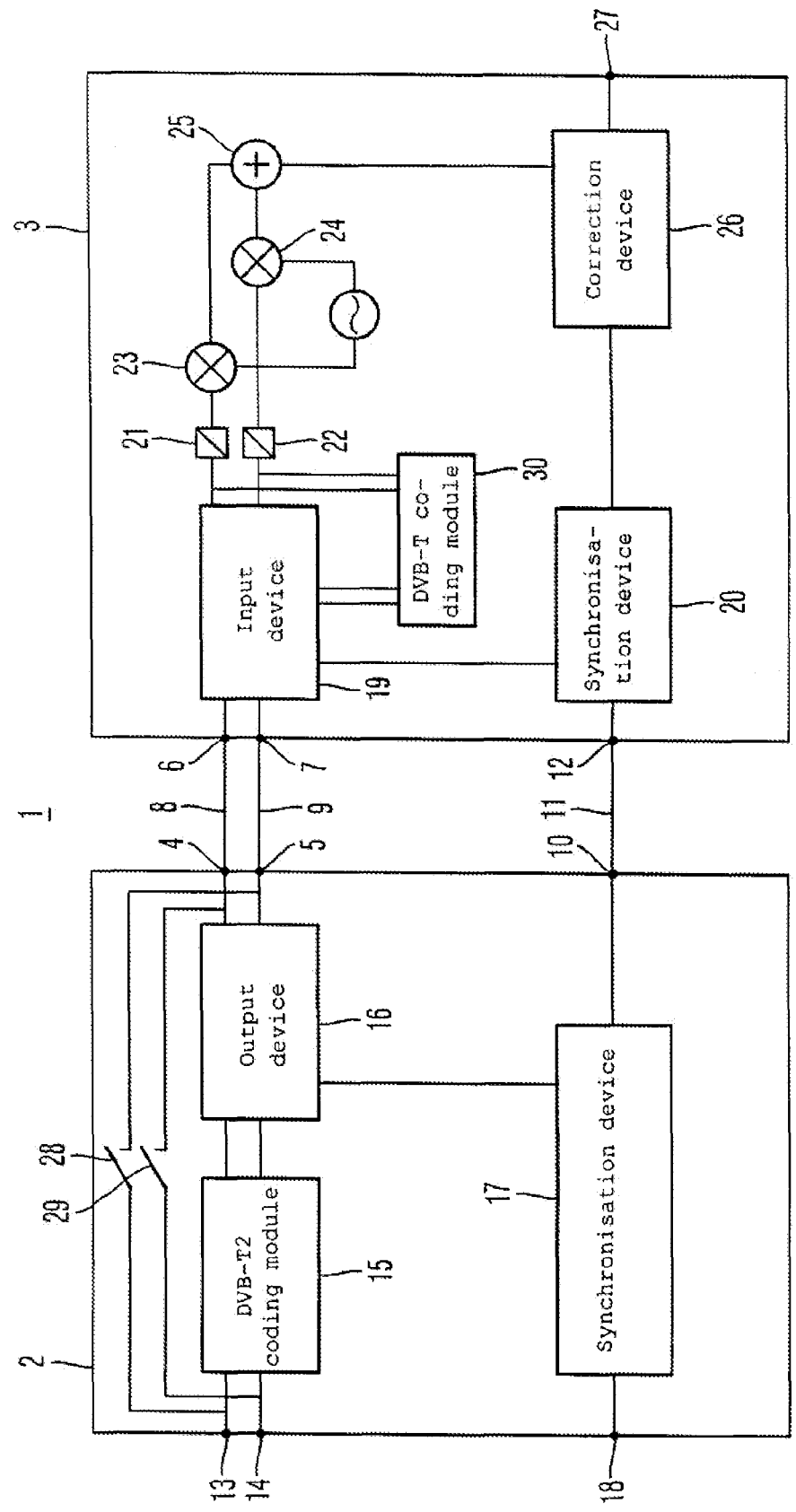
FIG. 1 shows a first exemplary embodiment of the system according to the invention.

FIG. 1 shows a first exemplary embodiment of the system according to the invention. The system 1 provides a coding device 2 and a control transmitter 3 as the device for further processing of a digital-baseband signal in the time domain or a digital intermediate-frequency signal in the time domain. For the sake of brevity, reference will be made here only to the baseband signal. The coding device 2 provides two ASI output interfaces 4 and 5 according to the European standard EN-50083-9. The control transmitter 3 provides two corresponding ASI interfaces 6 and 7 of the European standard EN-50083-9.

The first ASI output interface 4 of the coding device 2 is connected to the first ASI interface 6 of the control transmitter 3 via a first connecting line 8. The second ASI output interface 5 of the coding device 2 is connected to the second ASI interface 7 of the control transmitter 3 via a second connecting line 9. In the case of an optical ASI interface, the connecting lines 8 and 9 are fibreglass cables.

The coding device 2 further provides two ASI input interfaces 13 and 14 according to the European standard EN-50083-9, which are connected to a coding module 15. Via the ASI input interfaces 13 and 14, the coding module 15 receives an MPEG-2 ("Moving Picture Experts Group-2") transport stream ("transport stream", TS) or several MPEG-2 transport streams. An MPEG-2 transport stream comprises one or more MPEG-2 program streams (MPEG-2 PS), which each contain the continuous video stream and the associated further data of a television programme. This MPEG-2 transport stream is subdivided serially according to the European standard EN-50083-9 into 8 bit blocks and transmitted with appended error correction as 10-bit long data blocks. At the ASI input interfaces 13 and 14, the serially transmitted data blocks are converted into a synchronised and continuous MPEG-2 transport stream or once again into parallel, synchronised and continuous MPEG-2 transport streams. The MPEG-2 transport stream can be transmitted both optically and electrically via the ASI interfaces of the EN-50083-9 standard.

The coding module 15 receives the MPEG-2 transport stream and converts this or these into a digital-baseband signal in the time domain corresponding to the DVB-T2 standard.

A digital signal in the time domain, also referred to as a digital time signal, is characterised by a time sequence of discrete data points. This digital-baseband signal is passed to an output device 16 connected to the coding module 15. At this point, reference should once again be made to the fact that the baseband signal is only a signal type used in DVB-operating mode. A digital intermediate-frequency signal in the time domain could also be transmitted here.

The coding module 15 modulates the data of the MPEG-2 TS by means of quadrature amplitude modulations, such as QPSK, 16QAM, 32QAM, 64QAM, 256QAM, to points or constellations in the in-phase (I)—quadrature (Q)—diagram, which are also referred to as code words. The constellations are subdivided over the time and the available orthogonal frequencies of the baseband. In the DVB-T2 standard, the baseband can have a bandwidth of 1.7 MHz, 5 MHz, 6 MHz, 7 MHz, 8 MHz and 10 MHz. The coding module 15 adds different error correction mechanisms ("Forward Error Correction", FEC) to the signal in different coding stages and implements different interleaving processes ("Interleaving"), such as bit interleaving, cell interleaving, time interleaving and frequency interleaving. The constellations transmitted simultaneously on the orthogonal carrier frequencies are transformed digitally into the time domain through an inverse Fourier transform, for example, an inverse fast Fourier transform (IFFT). The test points of the time signal calculated in this manner are resolved with an accuracy of 14 bits. After the inverse Fourier transform, the digital-baseband signal is present in the time domain. The baseband signal is completed within the DVB-T2 standard by reducing the peak-to-average power ratio ("Peak to Average Power Ratio", PAPR), by inserting guard intervals ("Guard Interval") repeating redundant parts of the baseband signal and by inserting a preamble (P1). These digitally executed steps for further processing the digital baseband are, in a first exemplary embodiment, preferably also executed in the coding module 15. As an alternative, these steps can also be executed in the control transmitter 3 after the reading out of the digital-baseband signal.

The digital-baseband signal in the time domain is the inverse Fourier transform of a constellation in the I-Q-diagram allocated to a frequency in the baseband, or the inverse Fourier transform of several constellations in the I-Q-diagram allocated to several different frequencies in the baseband. The baseband signal is a digital time signal comprising discrete timing points in time succession. Since a baseband signal can only be transmitted in a real manner, a real component and an imaginary component of the inverse Fourier transform are transmitted as orthogonal, superimposed real signal components phase-shifted through 90°. The phase displacement through 90° can be achieved by mixing the real component with the sine of an intermediate frequency, that is to say, with an oscillator which alternates at the intermediate frequency, and by mixing the imaginary component with the cosine of an intermediate frequency, that is to say, with the oscillator phase-shifted through 90°. Accordingly, in the following section, the imaginary component of the inverse Fourier transform will be referred to as the sine component of the baseband signal, and the real component will be referred to as the cosine component of the baseband signal. The sine component and the cosine component are also sometimes referred to as the I-component and Q-component of the baseband signal. In the first exemplary embodiment, the cosine component is passed to the output device 16 without the phase displacement through 90°. In this context, it is not relevant for the invention whether the cosine component is transmitted already phase-shifted through 90° relative to the sine component or whether the phase displacement is only implemented in the control transmitter 3.

The coding module 15 now passes the digital sine component and the digital cosine component of the digital-baseband signal to the output device 16 in a parallel and synchronous manner but not yet superimposed. The output device 16 translates the sine component of the digital-baseband signal into a transmission signal according to the transmission standard of the first ASI output interface 4 defined in the European standard of the ASI output interface 4. Instead of an MPEG-2 transport stream, for which the first ASI output interface 4 is actually provided, the digital sine component is now subdivided into the 8 bit long payload data blocks of the transmission signal. Since a test point provides a length of 14 bits, each test point is subdivided into a first part of 7 bits and a second part of 7 bits and written in each case to an 8 bit block. The still undefined bit, for example, the first or last, is marked regarding whether this is the first or second part of the test point. As an alternative, the first part could also comprise 8 bits and the second part 6 bits. The 8 bit payload data blocks are expanded by the addition of control information and error correction mechanisms to 10-bit long transmission blocks. The transmission blocks are output in a serial manner corresponding to the standard of the first ASI output interface 4.

The cosine component of the digital-baseband signal is output serially to the control transmitter 3 via the second ASI output interface 5 in exactly the same manner as the sine component in 8 bit/10 bit data blocks. Every test point of the cosine component has precisely one associated test point of the sine component, which must be transmitted synchronously in order to preserve the association and to avoid disturbing the data flow. Accordingly, a transmission block with a first part of a test point of the sine component is transmitted simultaneously to the transmission block which provides the first part of the test point of the cosine component associated with the test point of the sine component.

For this purpose, the output device 16 is connected to a synchronization device 17, which passes a clock signal to the output device 16. The synchronization device 17 also passes this clock signal to a synchronization interface 10, which is connected via a line 11 to a interface 12 of the control transmitter 3. The synchronization interface 12 is connected via an input interface 18 to a device of the global positioning system (GPS) not illustrated in FIG. 1. The synchronization device 17 calculates the clock signal from the GPS device.

The control transmitter 3 provides an input device 19, which is connected to the input interfaces 6 and 7. The input device 19 reads the first and the second part of every test point from the input transmission blocks and combines these. The test points which are input via the first ASI-input interface 6 are combined to form the sine component of the digital-baseband signal, and the test points which are input via the second ASI-input interface 7 are combined to form the cosine component of the digital-baseband signal. The associated transmission blocks of the first or second part of associated test points are input synchronously in the input device 19. The synchronicity is checked through the clock signal output by the coding device 2 and passed via the synchronization interface 12 and the synchronization device 20 to the input device 19 and restored if required.

The sine and cosine components of the digital-baseband signal are output synchronously in each case to a digital/analog converter 21 and 22. The first digital/analog converter 21 converts the digital sine component of the baseband signal into an analog sine component of the baseband signal. Correspondingly, the second digital/analog converter 22 converts the digital cosine component of the baseband signal into an analog cosine component of the baseband signal. The analog sine and cosine components of the baseband signal are mixed via the mixer 23 and 24 to an intermediate frequency. The oscillator oscillations of the two mixers 23 and 24 provide the same frequency, but are phase-shifted through 90°. The analog cosine component mixed to the intermediate frequency and the analog sine component of the baseband signal mixed to the intermediate frequency are superimposed in the adder 25 with 90° phase displacement from the mixers 23 and 24 to form the analog intermediate-frequency signal. In the correction device 26, the analog intermediate-frequency signal is subjected to further correction steps and mixed to the radio frequency as a carrier frequency to form the radio signal. The radio signal is passed via the output interface 27 to an amplifier, which is not illustrated in FIG. 1, and transmitted amplified via an antenna, which is not shown in FIG. 1.

In an alternative exemplary embodiment, the digital sine component and the digital cosine component can already be digitally superimposed, phase-displaced through 90° in the coding module of the coding device 2 to form the digital-baseband signal. However, with the use of two ASI-output interfaces 4 and 5 for the transmission of the digital-baseband signal, the pattern with which the digital-baseband signal is distributed to the two ASI-output interfaces 4 and 5, must also be transmitted in order to read the digital-baseband signal from the two ASI-input interfaces again in the input device 19 and to form a continuous and synchronised digital-baseband signal. Consequently, the digital-baseband signal need only be converted into an analog baseband signal in a digital/analog converter. The analog baseband signal is then mixed to the intermediate frequency in a mixer and passed to the correction device 26.

Through the external coding of the MPEG-2 transport stream in the coding device 2 into a digital-baseband signal according to the DVB-T2 standard, through the transfer of the digital-baseband signal in the time domain via the ASI-interface to the control transmitter 3 and through the corresponding matching of the control transmitter 3 for the input of the digital-baseband signal from the transmitted signal, which is present in the format of the ASI-interface, the control transmitter 3 need no longer be replaced in its entirety, although it does not originally provide an input for the baseband signal. The control transmitter 3 need only be matched through a software update for the input of the digital-baseband signal and for skipping the DVB-T coding.

A downward compatibility for the DVB-T standard can be additionally realised by this invention. For this purpose, the coding device 2 need only short-circuit the two ASI-input interfaces 13 and 14 with the two ASI-output interfaces 4 and 5 and interrupt the DVB-T2 coding. To achieve this, the ASI-input and output interfaces 13, 14 and 4, 5 can each be connected directly via the switch 28 and 29. In this case, the input device 19 in the control transmitter 3 can pass the input MPEG-2 transport streams directly into the DVB-T coding module 30, which passes the digital-baseband signal to the digital/analog converter or the digital sine and cosine components of the baseband signal to the digital/analog converters 21 and 22.

Figure 2:
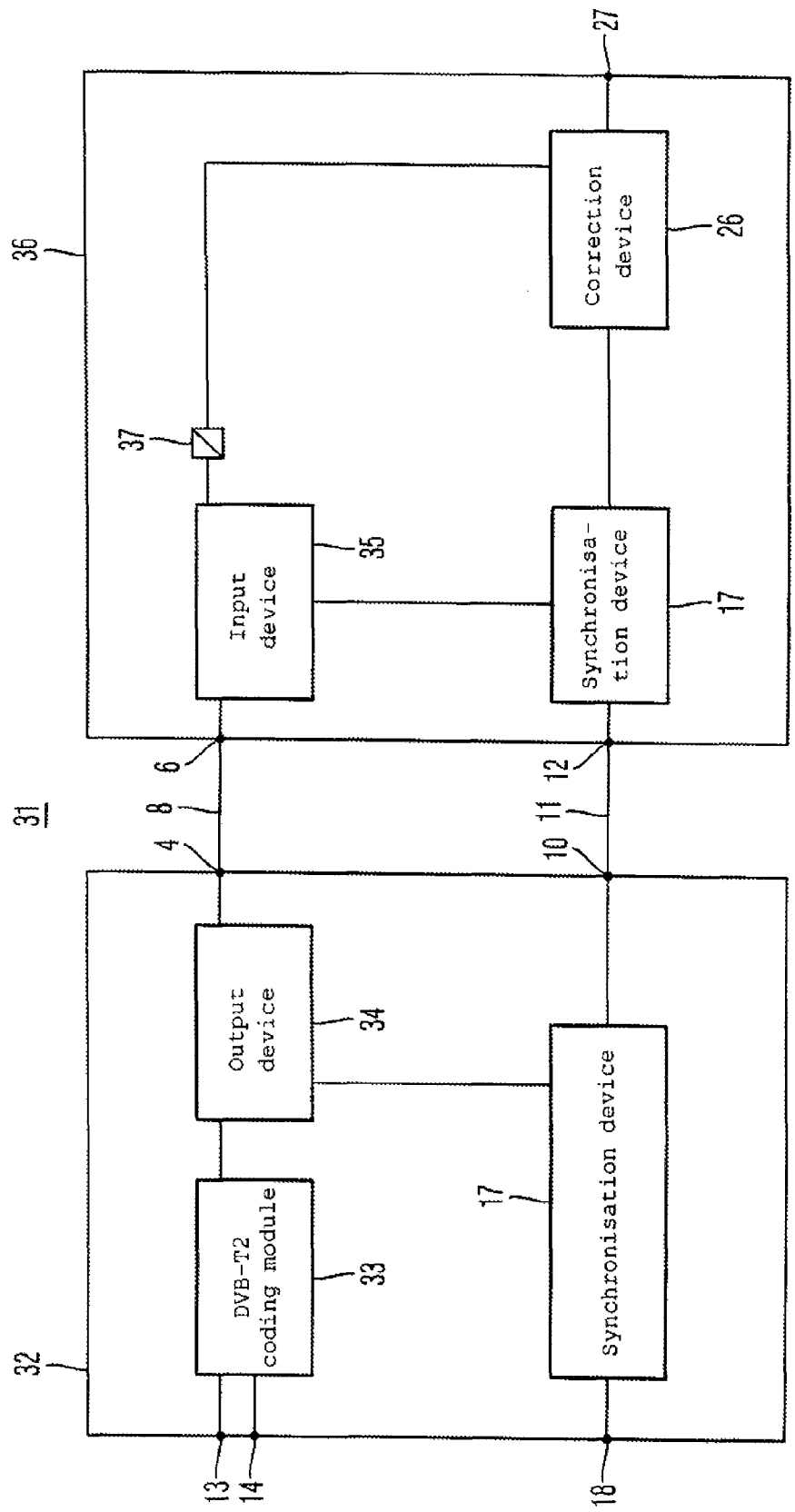
FIG. 2 shows a second exemplary embodiment of the system according to the invention.

FIG. 2 shows a second exemplary embodiment of the invention. The system 31 is structured in substantially the same manner as the system 1. Identical devices are accordingly marked with the same reference numbers, and the relevant description is not repeated. As in the case of the first exemplary embodiment of the system 1, a digital-baseband signal is generated in the coding module 33 of the coding device 32. Additionally, the sine component and the cosine component are digitally superimposed phase-displaced through 90° to form the digital baseband signal, and the digital-baseband signal is digitally mixed to an intermediate frequency. The digital intermediate-frequency signal in the time domain is passed to the output device 34, where it is converted into a transmission signal according to the transmission format of the ASI-output interface 4 via the connecting line 8 and the input interface 6 and is transmitted to an input device 35 of control transmitter 36. The input device 35 corresponds largely to the input device 19, wherein, instead of a digital sine component of the baseband signal, it determines the digital intermediate-frequency signal directly from the transmission signal. Through the superimposition of the sine and cosine components in the coding module 33 and through the mixing of the digital-baseband signal to the intermediate frequency, the same data rate can be achieved with an ASI-interface as in the first exemplary embodiment. As an alternative, dependent upon the required data rates, the data rate can once again be doubled by transmitting the intermediate-frequency signal via two ASI-interfaces, corresponding to the embodiment specified by the first exemplary embodiment.

The input digital intermediate-frequency signal is converted in a digital/analog converter 37 into an analog intermediate-frequency signal. The analog intermediate-frequency signal is further processed in the correction device 26, as in the control transmitter 3 of the first exemplary embodiment.

Figure 3:
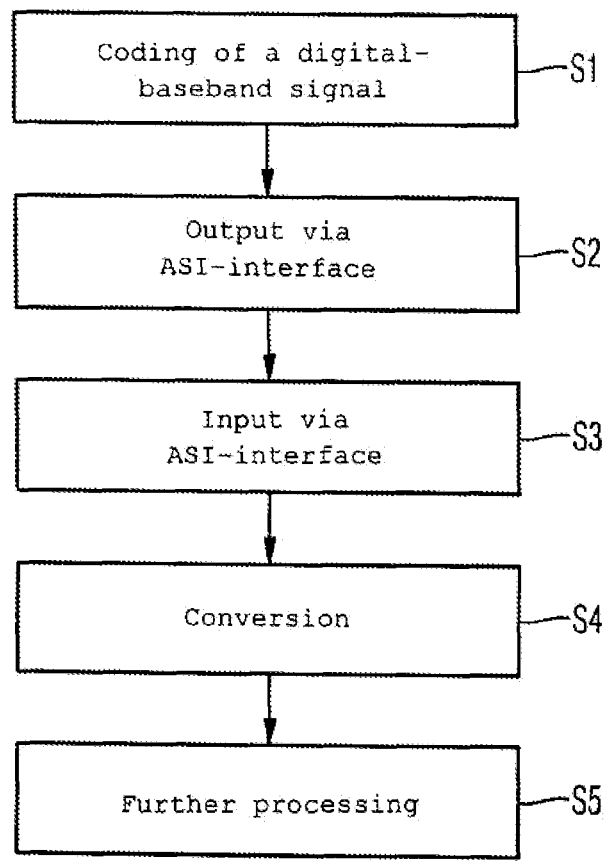
FIG. 3 shows a flow chart of the method steps according to the invention.

FIG. 3 shows a flow chart with the steps of the method according to the invention for the external coding of a digital datastream. Since the method has already been described in connection with the first two exemplary embodiments, only the most important steps will be described again here.

In a first step S1, an MPEG-2 TS is coded in a coding module 15 or 33 of the coding device 2 or 32 as a digital datastream into a digital-baseband signal or a digital intermediate-frequency signal according to the DVB-T2 standard. This digital signal is brought into the digital format of the ASI-interface 4 and/or 5 and transmitted in a second step S2 via this ASI-interface 4 and/or 5 to the control transmitter 3 or 36. In a third step S3, the digital-baseband signal or the digital-intermediate frequency signal is read out from the received signal. In a fourth step S4, the digital-baseband signal or the digital intermediate-frequency signal is converted in a digital/analog converter 21, 22 or 37 into an analog baseband signal or intermediate-frequency signal of the DVB-T2 standard, and, in a fifth step S5, further processed in a correction device 26 to form a radio signal according to the DVB-T2 standard.

As an alternative to an MPEG-2 transport stream, any datastream, such as a music datastream can be used. The coding module 15 is preferably a chip or a chipset, but can, as an alternative, also comprise a plurality of individual devices.

The invention is described with the example of a radio transmission system of the DVB-T2 standard. The invention is not restricted to the exemplary embodiment described. On the contrary, the invention can also be used in transmission systems for satellite and cable supported systems, such as DVB-S and DVB-C. Furthermore, the invention can, in principle, be used in all transmission systems of all radio standards.

The invention can also be used in other data transmission systems. The invention is not restricted to the exemplary embodiment described. On the contrary, all aspects of the exemplary embodiments can advantageously be combined.

The invention claimed is:

1. A coding device for converting a digital datastream into a digital-baseband signal in the time domain or into a digital intermediate-frequency signal in the time domain, comprising at least one asynchronous-serial interface configured to output the digital-baseband signal or the digital intermediate-frequency signal in the time domain, wherein the coding device provides at least one second asynchronous-serial interface, and the sine component of the digital-baseband signal is output as a first digital signal, and the cosine component of the digital-baseband signal is output as a second digital signal via different asynchronous-serial interfaces.

2. The coding device according to claim 1,
further comprising an output device connected to the asynchronous-serial interface and configured to convert the digital-baseband signal or digital intermediate-frequency signal into the transmission format of the asynchronous-serial interface.

3. The coding device according to claim 2,
wherein data points of the digital-baseband signal or intermediate-frequency signal in the output device are subdivided into at least two transmission blocks of the transmission format of the asynchronous-serial interface, and the blocking pattern is output with the converted digital-baseband signal or digital intermediate-frequency signal if the data size of a data point is greater than the data size of an individual transmission block.

4. The coding device according to claim 2,
further comprising a synchronization unit connected to the output device and/or a synchronization interface, wherein the synchronization unit is configured to output a clock signal.

5. The coding device according to claim 1,
further comprising an asynchronous-serial input interface configured to input the digital datastream, wherein the asynchronous-serial input interface can be connected directly to the asynchronous-serial interface.

6. A device for further processing of a digital-baseband signal in the time domain or a digital intermediate-frequency signal in the time domain, comprising:
an asynchronous-serial interface configured to input the digital-baseband signal or the digital intermediate-frequency signal; and
at least one second asynchronous-serial interface, wherein the sine component of the digital-baseband signal is input as a first digital signal, and the cosine component of the digital-baseband signal is input as a second digital signal via different asynchronous-serial interfaces.

7. The device according to claim 6,
further comprising an input device connected to the asynchronous-serial interface and configured to convert an input signal present in the transmission format of the asynchronous-serial interface into the digital-baseband signal or the digital intermediate-frequency signal.

8. The device according to claim 7,
wherein every data point of the digital-baseband signal or intermediate-frequency signal in the input device is determined from transmission blocks defined in the transmission format of the asynchronous-serial interface on the basis of a blocking pattern input with the digital-baseband signal or intermediate-frequency signal if the data size of a data point is greater than the data size of the transmission block.

9. The device according to claim 7,
further comprising a synchronization interface connected to the input device, wherein the synchronization interface is configured to read a clock signal.

10. The device according to claim 6,
further comprising a digital/analog converter configured to convert the digital-baseband signal into an analog baseband signal or to convert the digital intermediate-frequency signal into an analog intermediate-frequency signal.

11. The device according to claim 10,
further comprising a coding module configured to convert a digital datastream into a digital-baseband signal in the time domain or into a digital intermediate-frequency signal in the time domain, wherein the coding module can be switched between the asynchronous-serial interface and the digital/analog converter.

12. A system comprising:
a coding device according to claim 1; and
a device according to claim 6, wherein the asynchronous-serial interface of the coding device is connected to the asynchronous-serial interface of the device.

13. A method for the external digital coding of a baseband signal or intermediate-frequency signal, the method comprising:
converting a digital datastream into a digital-baseband signal in the time domain or into a digital intermediate-frequency signal in the time domain within a coding device;
outputting the digital-baseband signal or intermediate-frequency signal via an asynchronous-serial interface of the coding device;
inputting the output digital-baseband signal or intermediate-frequency signal to a second asynchronous-serial interface of a device connected to the asynchronous-serial interface of the coding device; and
processing the input digital-baseband signal or intermediate-frequency signal wherein the method further comprises
outputting a sine component of the digital-baseband signal as a first digital signal via the asynchronous-serial interface of the coding device, and a cosine component of the digital-baseband signal as a second digital signal via a different at least one other asynchronous-serial interface of the coding device; and
reading the sine component of the digital-baseband signal as the first digital signal via the asynchronous-serial interface of the device, and the cosine component of the digital-baseband signal as the second digital signal via different at least one other second asynchronous-serial interface of the device.

14. The coding device according to claim 3, further comprising a synchronization unit connected to the output device and/or a synchronization interface, wherein the synchronization unit is configured to output a clock signal.

15. The device according to claim 8, further comprising a synchronization interface connected to the input device, wherein the synchronization interface is configured to read a clock signal.

* * * * *